United States Patent
Bigolin et al.

(10) Patent No.: US 12,151,411 B2
(45) Date of Patent: Nov. 26, 2024

(54) MOULDING UNIT FOR PRODUCING A SUPPORT ELEMENT FOR THE HUMAN BODY, SUCH AS A VEHICLE SEAT

(71) Applicant: SELLE ROYAL S.p.A., Pozzoleone (IT)

(72) Inventors: Barbara Bigolin, Vicenza (IT); Marco Malfatti, Vicenza (IT)

(73) Assignee: SELLE ROYAL S.p.A., Pozzoleone (IT)

( * ) Notice: Subject to any disclaimer, the term of this patent is extended or adjusted under 35 U.S.C. 154(b) by 583 days.

(21) Appl. No.: 17/420,563

(22) PCT Filed: Nov. 14, 2019

(86) PCT No.: PCT/IB2019/059786
§ 371 (c)(1),
(2) Date: Jul. 2, 2021

(87) PCT Pub. No.: WO2020/115587
PCT Pub. Date: Jun. 11, 2020

(65) Prior Publication Data
US 2022/0088841 A1  Mar. 24, 2022

(30) Foreign Application Priority Data
Dec. 7, 2018  (IT) .................. 102018000010890

(51) Int. Cl.
| | |
|---|---|
| *B29C 44/08* | (2006.01) |
| *B29C 44/06* | (2006.01) |
| *B29C 44/14* | (2006.01) |
| *B29C 44/58* | (2006.01) |
| *B29K 75/00* | (2006.01) |
| *B29L 31/30* | (2006.01) |
| *B62J 1/26* | (2006.01) |

(52) U.S. Cl.
CPC ............ *B29C 44/086* (2013.01); *B29C 44/06* (2013.01); *B29C 44/143* (2013.01); *B29C 44/585* (2013.01); *B62J 1/26* (2013.01); *B29K 2075/00* (2013.01); *B29L 2031/3094* (2013.01)

(58) Field of Classification Search
CPC ... B29C 44/086; B29C 44/143; B29C 44/585; B29C 45/0441; B62J 1/18
See application file for complete search history.

(56) References Cited

U.S. PATENT DOCUMENTS

| | | | |
|---|---|---|---|
| 4,544,126 A | 10/1985 | Melchert | |
| 4,815,361 A * | 3/1989 | Chiarella | .................. B62J 1/18 |
| | | | 297/214 |
| 2008/0193699 A1* | 8/2008 | Terreni | .................. B29C 44/428 |
| | | | 264/261 |
| 2016/0176082 A1 | 6/2016 | Bigolin | |
| 2017/0036724 A1* | 2/2017 | Yu | .............. B62J 1/26 |

FOREIGN PATENT DOCUMENTS

DE   2107517 A1 *  8/1972  ........... B29C 44/086

OTHER PUBLICATIONS

International Search Report for PCT/IB2019/059786 dated Jan. 14, 2020 (4 pages).

* cited by examiner

*Primary Examiner* — Alison L Hindenlang
*Assistant Examiner* — Virak Nguon
(74) *Attorney, Agent, or Firm* — Tutunjian & Bitetto, P.C.

(57) ABSTRACT

The present invention regards a moulding unit for producing a support element for the human body, such as a vehicle seat.

8 Claims, 5 Drawing Sheets

Fig. 11

MOULDING UNIT FOR PRODUCING A SUPPORT ELEMENT FOR THE HUMAN BODY, SUCH AS A VEHICLE SEAT

TECHNICAL FIELD OF THE INVENTION

The present invention regards a moulding unit for producing a support element for the human body as well as a moulding method.

STATE OF THE PRIOR ART

The moulds of vehicle seats, in particular seats for bicycles usually comprise a female component and a male component, which are movable with respect to each other between a closed position and an open position.

As is known, often vehicle seats comprise a felt or base body that can be constrained, for example by means of a so-called "fork", to a seat post tube, a padding applied on the felt and if desired a cover or sleeve enclosing the padding.

Solutions were then proposed for making seats with a double padding with densities different from each other.

In accordance with these solutions, first a first foam layer is applied on the felt or hull of the seat, then the semi-foamed layer is moved into another mould in order to carry out a second foaming on the hull with the first foam layer, e.g., with the integral polyurethane.

US2008193699A1 discloses a solution according to the state of the prior art.

SUMMARY OF THE INVENTION

One object of the present invention is to provide a new moulding unit for making a support element for the human body, such as a seat for vehicles, e.g., for seats for bicycles or motorcycles.

Another object of the present invention is to provide a moulding unit which allows making a support element as stated above in a simple and quick manner.

Another object of the present invention is to provide a moulding unit which ensures the obtainment of a support element with greater quality and efficiency with respect to the conventional moulds.

Another object of the present invention is to provide a moulding unit which allows obtaining a support element, such as a seat with a resistant external layer, and a soft and less dense internal layer such to confer a high lightness and softness to the support element or seat.

Another object of the present invention is to provide a new method for moulding a support element for the human body, such as a vehicle seat, e.g., a seat for bicycles or motorcycles, but also backs and seats for anatomic chairs, especially intended for elderly and handicapped people, insoles for shoes, orthopaedic mattresses among others.

In accordance with one aspect of the invention, a moulding unit is provided according to the present application.

The present application refers to preferred and advantageous embodiments of the invention.

BRIEF DESCRIPTION OF THE DRAWINGS

Other characteristics and advantages of the invention will be more evident from the description of one embodiment of a moulding unit, illustrated as an example in the enclosed drawings, in which.

In the enclosed drawings, equivalent parts or components are marked with the same reference numbers.

DETAILED DESCRIPTION OF THE INVENTION

With reference to the enclosed figures, a moulding unit 1 according to the present invention is illustrated, for producing a support element for the human body, such as a vehicle seat, e.g., a seat for bicycles or motorcycles, but also backs and seats for anatomic chairs, especially intended for elderly and handicapped people, insoles for shoes, orthopaedic and not orthopaedic mattresses among others.

More particularly, the unit 1 comprises a first component or male component 2 having engagement means 2a for a felt or hull HU for a support element or seat SA to be moulded as well as a second component or female component 4 delimiting a first moulding recessed area 5 in which a mixture to be solidified or hardened close to the felt or hull HU can be supplied or poured.

Figure 1:
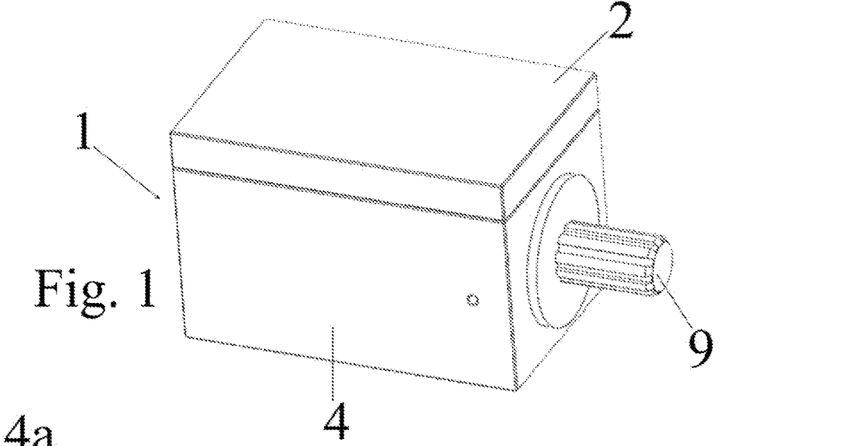
FIG. 1 is a slightly top perspective view of a moulding unit according to the present invention in closed position.
Figure 2:
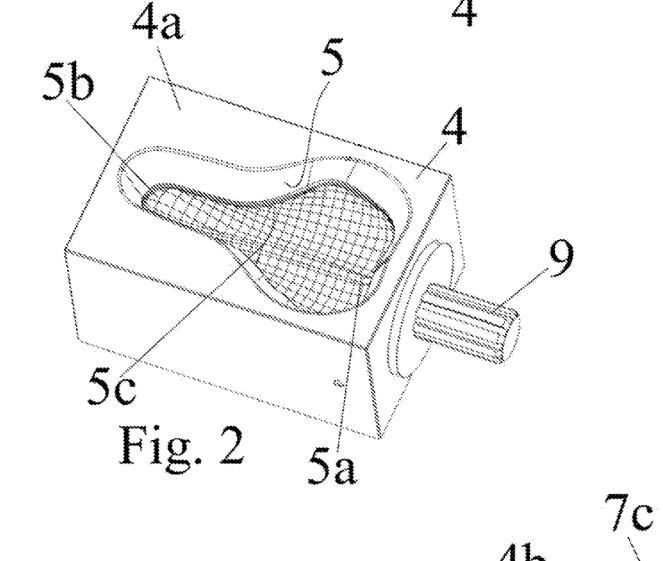
FIGS. 2 and 3 illustrate a female component of the unit of FIG. 1 from respective sides.
Figure 3:
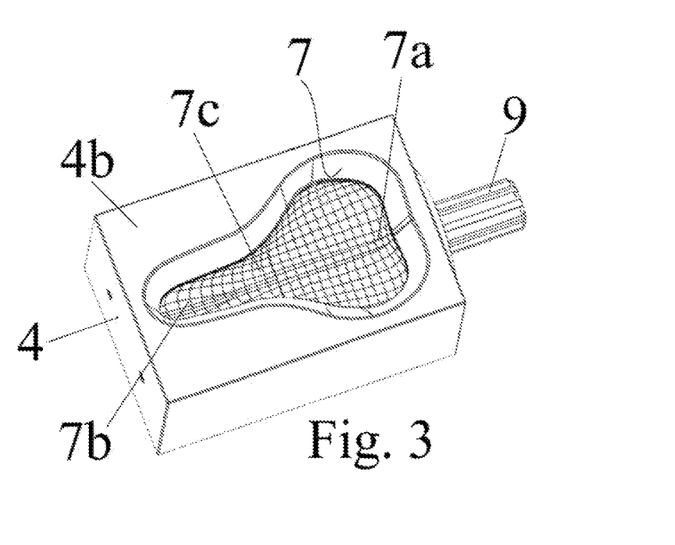
Figure 4:
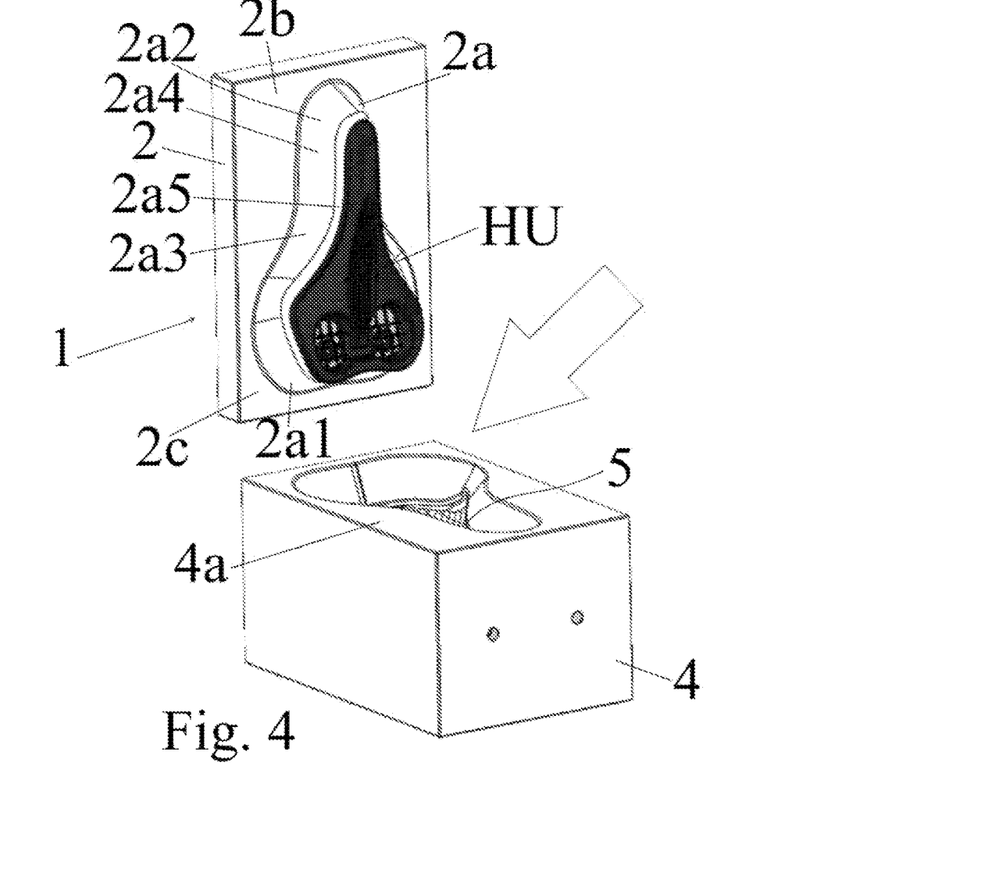
FIGS. 4 to 10 schematically illustrate respective steps of the method according to the present invention.
Figure 5:
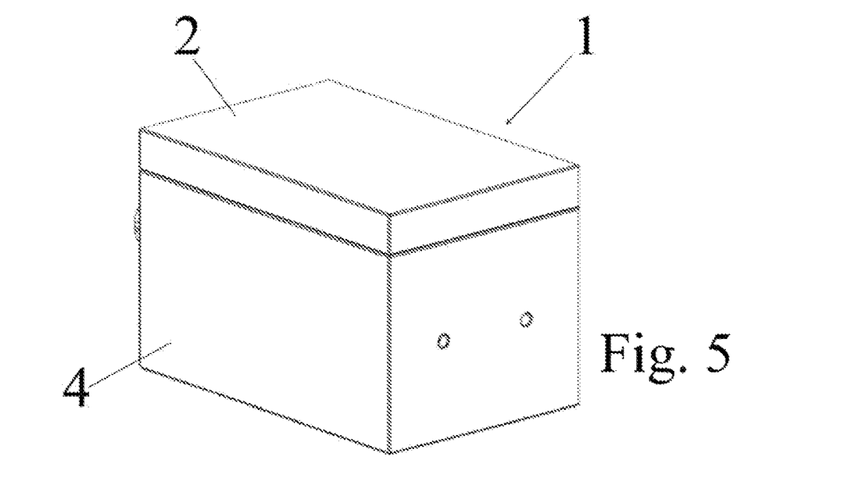

Then, provided in the unit are means for approaching-moving away the first 2 and the second component 4 between at least one first open position (see FIG. 4) of the moulding unit 1, and at least one first closed position (see FIG. 5) for moulding or obtaining a felt or hull HU with a first foaming or first moulding layer S1.

The first foaming or first moulding layer S1 could be obtained by means of different foams or a sandwich of foams having densities that are different from each other.

The approaching-moving away means can comprise an electric actuator, pneumatic actuator or actuator of another type set to mutually approach-move away first 2 and second component 4 along a rectilinear or even angular direction, i.e. the first 2 or second component 4 can be moved with respect to the other component 4, 2 along a predetermined rectilinear direction or it can be moved angularly in approaching—closing or moving-away—opening with respect to the other component 4, 2. Clearly, the approaching-moving away means could also be set for moving both the first 2 and the second component 4 and not necessarily only one of the two.

More particularly, in the first open position, it is possible to constrain a felt or hull HU to the engagement means 2a.

For such purpose, the male component 2 comprises a main sheet 2b, while the engagement means comprise a shaped portion 2a projecting from the main sheet 2b or better yet from a main face 2c thereof, which is arranged to snap-engage or engage via forced insertion a cavity of a felt or hull HU of a support element.

If desired, also through channels could be provided in the main sheet 2b as well as suctioning means in fluid communication with the through channels, such that it is possible to maintain the felt or hull HU in position on the engagement means by means of suctioning.

In the case of a vehicle seat, such as a bicycle or a motor bicycle, the shaped portion 2a is configured so as to engage a felt or hull HU of a seat for example in a manner substantially complementary to the recessed zone defined by a felt or hull HU of a seat. Thus, for example, the shaped portion 2a could comprise a body with decreasing section moving away from the main sheet 2b and with configuration from one side to the other with a first section 2a1, corresponding to the back of a seat or better yet of a hull for a seat, a second section 2a2, corresponding to the tip of a seat or better yet of a hull for a seat, of lower width, lower than about half or less than the first section 2a1 and a third section 2a3 intermediate between the first 2a1 and the second 2a2 section for connecting the same, and such third section 2a3 has width gradually decreasing in the passage from the first 2a1 to the second section 2a2.

If desired, the shaped portion 2a can comprise, in moving away from the main sheet 2b, a first part with lateral annular border 2a4, then a second part with lateral annular border (covered in the figure by the felt or hull HU) with width lower than the first part with lateral annular border 2a4 with an external shoulder 2a5, parallel to the face 2c or tilted with respect to the same and delimited between the external edge of the second part and the external edge of the first part with annular border 2a4.

In such case, the engagement portion would be mainly constituted by the second part with lateral annular border.

Still in the first open position, a first mixture can be fed into the first recessed area 5, such that the first mixture, with moulding unit closed, is on or around the felt or hull HU. Clearly, the first mixture could also be fed with moulding unit closed, by means of a suitable conveyance channel, for example made in the second component or female component.

In the first closed position, instead, the first 2 and the second component 4 are in contact along respective surfaces or faces 2c, 4a so as to sealingly close (if desired due to suitable seals) the recessed area 5 close to and enclosing the felt or hull HU. This indicates that the recessed area 5 has greater width than the felt or hull HU and hence clearly greater width than the engagement means 2a, so as to define-between walls of delimitation of the recessed area 5 and felt HU mounted on the engagement means 2a-a first moulding impression where the first mixture will be situated in the first closed position or where the first mixture will actually be introduced or injected.

After having supplied or poured a first mixture into the open moulding unit so as to at least partially fill the recessed area 5, the moulding unit is brought into the first closed position such that the recessed area 5 is on or around the felt or hull HU, with the felt or hull HU actually immersed in the first mixture that was previously supplied or poured. At this point, the mixture can be moulded so as to obtain a felt or hull with a first foaming or first moulding layer S1. Clearly, the moulding can be carried out by applying pressure and/or heat, so that the moulding unit 1 could be provided with means for heating the recessed moulding area 5 or not.

In addition, the moulding unit 1 delimits at least one second recessed area 7 with dimensions different from those of the first recessed area 5, in particular with greater size than the first recessed area 5 and configured so as to be able to contain a zone of shape and size equal to the first recessed area 5.

The second recessed area 7 is positionable close to and enclosing the felt or hull HU or better yet the felt or hull with a first foaming or first moulding layer S1 as an alternative to the first recessed area 5.

A second mixture to be solidified or hardened can be supplied or poured in the second recessed area 7, in particular close to the felt or hull with a first foaming or first moulding S1 for making a second foaming or second moulding layer or spraying layer S2.

The second recessed area 7 is then positionable in a second closed position close to the felt or hull that was previously moulded with a first foaming or first moulding layer S1 as an alternative to the first recessed area 5 for the moulding of a second foaming or second moulding layer on a felt or hull that was previously moulded with a first foaming or first moulding layer S1, such that a felt or hull covered with two foamings or two moulding layers S1, S2 can be obtained.

Clearly, the second recessed area 7 has width such to define-between the walls of delimitation of the second recessed area 7 and a felt or hull previously moulded with a first foaming or first moulding layer S1 mounted on the engagement means 2a-a second moulding impression where the mixture will actually be during the moulding for making a second foaming or second moulding layer on a felt. The second moulding impression can have a thickness of 0.5-10 mm, preferably 1-4 mm, so as to obtain a second foaming or second moulding layer with such thickness.

In any case, with the moulding unit 1 in the second open position, a second mixture is fed into the second recessed area 7 and then the moulding unit is closed, bringing it into a second closed position with the second recessed area 7 on or around the felt or hull that was previously moulded with a first foaming or first moulding layer S1, with the felt or hull with a first foaming or first moulding layer S1 actually immersed in the second mixture that was previously supplied or poured in the recessed area 7.

In the second closed position, therefore, the second mixture can be moulded so as to obtain a felt or hull with two foamings or two moulding layers S1, S2. Clearly, also in such case the moulding can be carried out by applying heat or not, so that the moulding unit 1 could be provided or not provided with means for heating the second recessed moulding area 7. Clearly, the second mixture could also be supplied to a closed moulding unit, by means of a suitable conveyance channel, e.g., made in the second component or female component.

Preferably, the female component 4 delimits both the first recessed area 5 and the second recessed area 7.

On such matter, the female component 4 can be rotatably mounted, if desired around an axis orthogonal to the approaching-moving away direction of the first 2 and the second component 4 or in any case to the relative rotation axis to approach-move away or open-close the first 2 and second component 4.

In such case, the female component 4 delimits the first recessed area 5 on a first face 4a thereof and the second recessed area 7 on a second face 4b thereof opposite or different from the first face 4a. With reference to such aspect, the female component 4 can comprise a main body with box-like or parallelepiped configuration, e.g., with the first face 4a substantially parallel and opposite the second face 4b or in any case different from the second face 4b.

According to such embodiment, the moulding unit 1 also comprises rotation or angular displacement means, such as an electric actuator, pneumatic actuator or actuator of another type, of the female component 4 between a first trim in which the first face 4a or better yet the first recessed area 5 is directed towards the male component 2 and, if desired, parallel to the main face 2c thereof, to obtain the first foaming or first moulding layer and a second trim in which the second face 4b or better yet the second recessed area 7 is directed towards the male component 2 and, if desired, parallel to the main face 2c thereof, to obtain the second foaming or second moulding layer. Clearly, in the first trim, the second face 4b is directed away from the male component 2, while in the second trim the first face 4a is directed away from the male component 2.

Thus, for example, the female component 4 could include a rotation pin 9 to be constrained to the mandrel of a machine for driving the female component 4 in rotation, clearly when the unit 1 is in open position.

Alternatively, the female component 4 could delimit the first recessed area 5 and the second recessed area 7, if desired also on the same face and be displaceable by translation means so as to alternately bring such areas 5, 7 across from or directed towards the first male component 2 or better yet towards the main face thereof. In substance, the translation means are such to bring the female component 4 alternatively in a first trim in which the first recessed area 5 is directed towards the male component 2 to obtain the first foaming or first moulding layer S1 and a second trim in which the second recessed area 7 is directed towards the male component 2 to obtain the second foaming or second moulding layer or spraying layer S2.

According to one variant, the female component 4 could comprise two elements, a first element delimiting the first recessed area 5 and a second element delimiting the second recessed area 7, with the first element being removably houseable in the second element or better yet with the wall of delimitation of the first recessed area 5 removably houseable in the second recessed area.

In accordance with another variant, the moulding unit could comprise two female components, each delimiting a respective recessed area 5, 7 and alternatively positionable facing the male component in order to execute respective steps for moulding the first foaming or first moulding layer S1 or the second foaming or second moulding layer or spraying layer S2.

In addition, when the female component 4 is in the second trim, after having supplied a second mixture, the approaching-moving away means are designated to mutually approach-move away, according to a linear or angular displacement, first 2 and second 4 component between at least one second open position of the moulding unit 1 and at least one second closed position in which the first 2 and the second 4 component are in contact along respective surfaces or faces 2c. 4b so as to sealingly close (if desired due to suitable seals) the second recessed area 7 close to the felt or hull with a first foaming or first moulding layer S1 and then proceed to mould a second foaming or second moulding layer S2 by means of heat and/or pressure on the felt or hull with a first foaming or first moulding layer S1 for obtaining a felt or hull covered with two foamings or two moulding layers S1, S2.

In the case of a moulding unit for producing a vehicle seat, the female component 4 can be rotatably mounted around an axis substantially parallel to the direction from the first section 2a1 to the second section 2a2, i.e., to the back-front direction of a seat to be produced. Clearly, a solution could be provided with different rotation or pivoting axis.

In detail, regarding the configuration of the recessed areas 5, 7, if the unit 1 was for producing a vehicle seat, such as a bicycle or a motor bicycle, the first recessed area 5 could have a configuration such to define, with the felt or hull HU, a first moulding impression substantially corresponding to the padding of a seat or to an internal layer of the padding of a seat, while the second recessed area 7 could have a configuration such to define—with the felt or hull HU provided with a first foaming or first moulding layer S1—a second moulding impression substantially corresponding to the cover of a seat or to an external layer of the padding of a seat.

Thus, for example, one or both recessed areas 5, 7 from one side to the other have a first part 5a, 7a, corresponding to the back of a seat and designated to enclose the back of a felt or hull HU as well as the first section 2a1, and a second part 5b, 7b corresponding to the tip of a seat with smaller width, smaller than about half or less than first part 5a, 7a and designated to enclose the tip of a felt or hull HU as well as the second section 2a2, and a third part 5c, 7c intermediate between the first 5a, 7a and the second 5b, 7b part connecting the same, and such third part 5c, 7c has width gradually decreasing in the passage from the first 5a, 7a to the second part 5b, 7b.

If desired, one or both recessed areas 5, 7 could have section decreasing in moving away from the respective face 4a, 4b of the female component 4, i.e., in the direction from the outside to the inside of the female component 4 itself.

With a moulding unit according to the present invention, a method can be provided for moulding a support element for the human body, such as a vehicle seat, for example a seat for bicycles or motorcycles, but also backs and seats for chairs.

Figure 6:
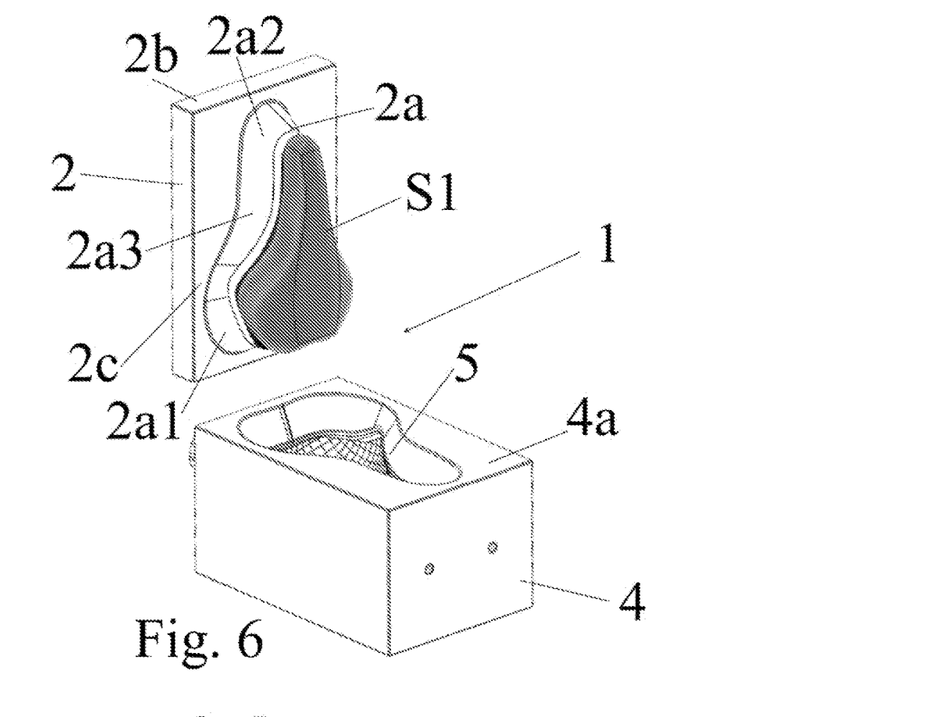
Figure 8:
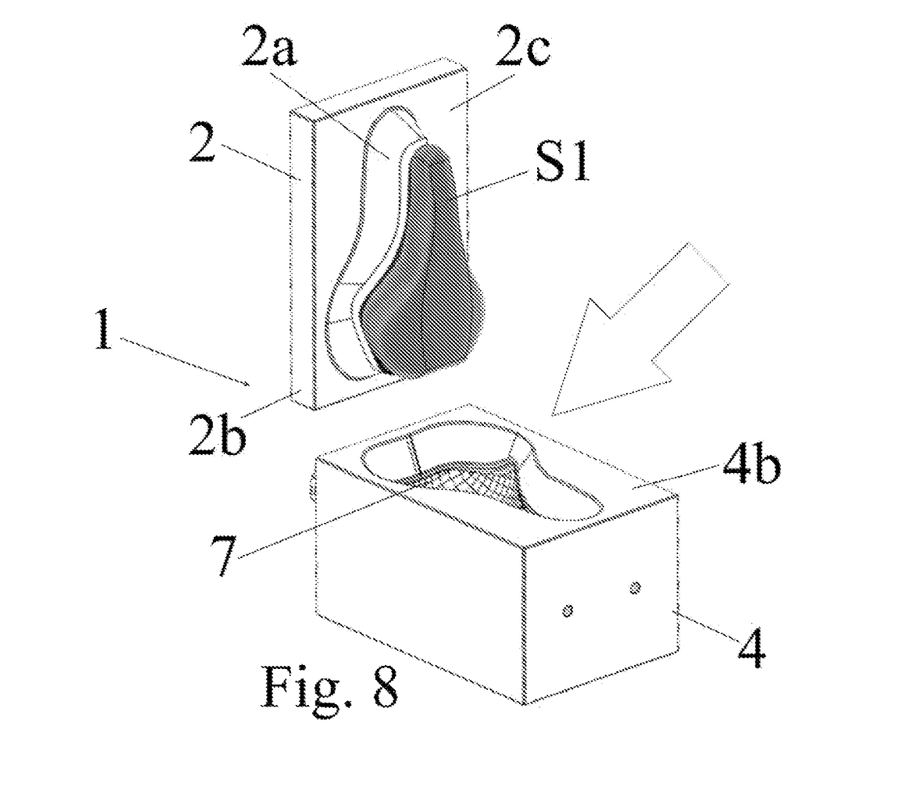
Figure 9:
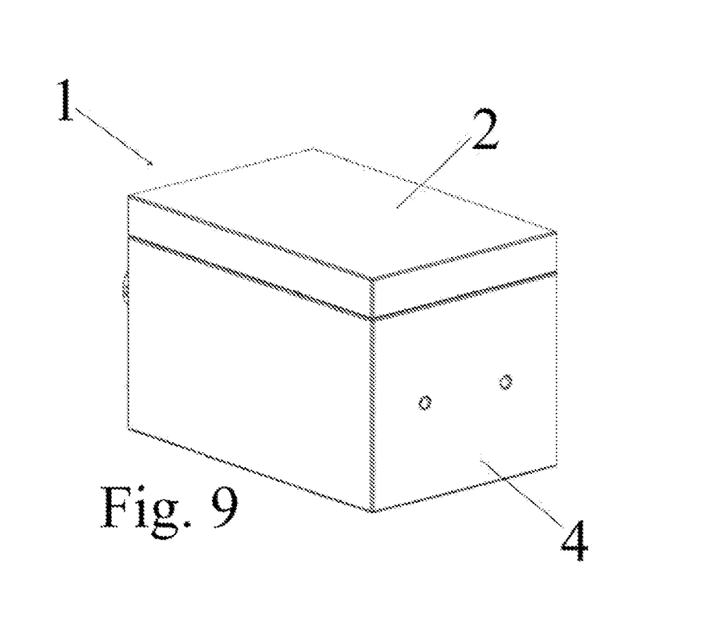
Figure 10:
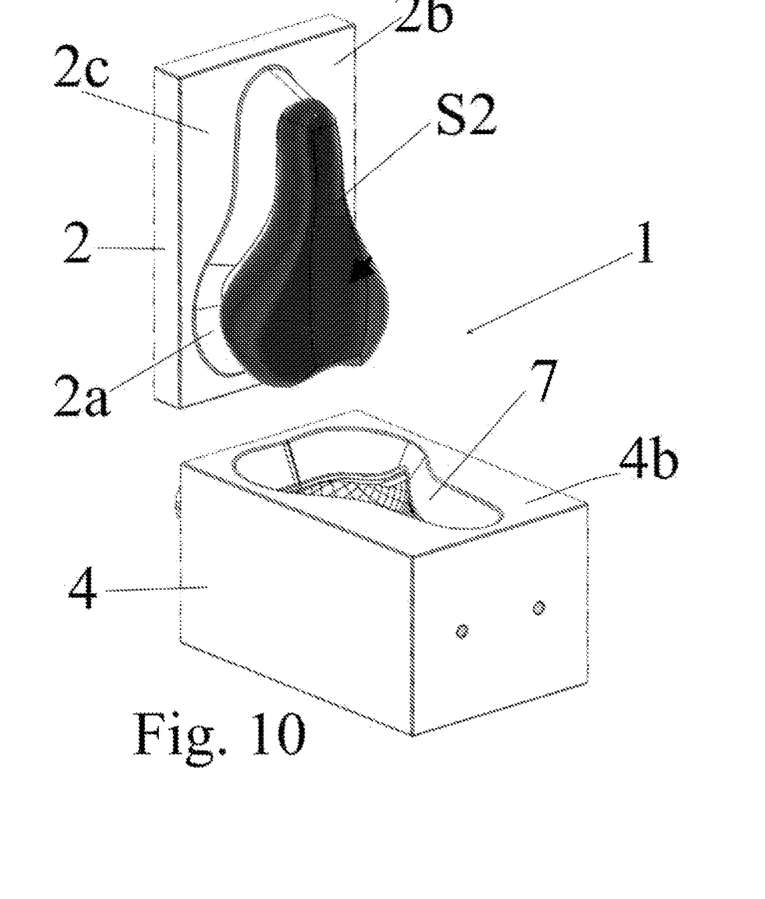
Figure 11:
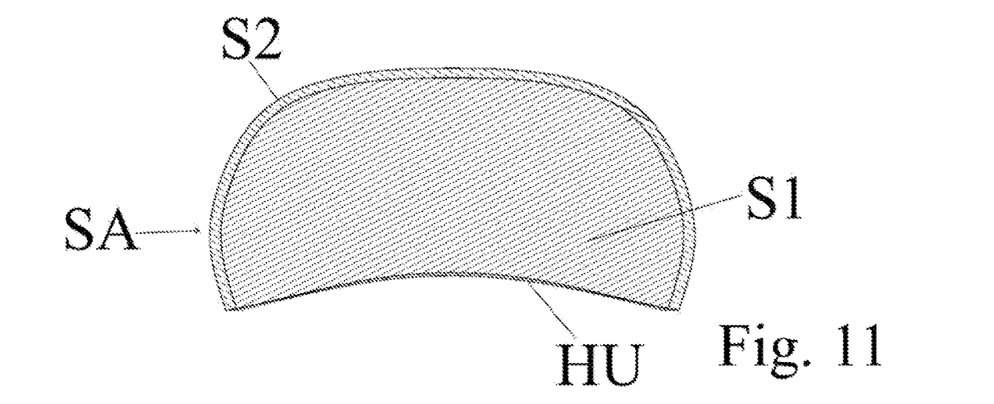
FIG. 11 is a section view of a vehicle seat obtained by means of a method according to the present invention.

More particularly, such method comprises the following steps:
- constraining, e.g., via snap or forced insertion, a felt or hull HU to the engagement means 2a of the first component or male component 2,
- supplying or pouring, e.g., via spraying and/or pouring a first mixture in the first recessed area 5 (see FIG. 4);
- bringing (by moving the first 2 and/or the second component 4) the unit 1 into the first closed position (see FIG. 5) by means of the approaching-moving away means,
- moulding, by means of applying heat and/or by means of closing or abutting pressure between the first component 2 and the second component 4, the first mixture close to the felt or hull HU thus obtaining a felt or hull covered with a first foaming or first moulding layer S1,
- moving the first component 2 and the second component 4 away, while the felt or hull with a first foaming or first moulding layer S1 remains adherent or constrained to the engagement means 2a of the first component or male component 2 (see FIG. 6),
- supplying or pouring, e.g., via spraying and/or pouring a second mixture into the second recessed area 7 (see FIG. 8);
- bringing (by moving the first 2 and/or the second 4 component) the unit 1 into a second closed position with the second recessed area 7 close to or enclosing the felt or hull with a first foaming or first moulding layer S1 (see FIG. 9),
- moulding, by means of applying heat and/or by means of closing or abutting pressure between the first component 2 and the second component 4, the second mixture thus obtaining a felt or hull covered with two foamings or two moulding layers S1, S2.

It is confirmed that the first foaming or first moulding layer S1 could be obtained by means of different foams or a sandwich of foams having different densities from each other and also applied during subsequent steps. In addition, this could for example be obtained by means of foaming and/or spraying and/or pouring.

With regard instead to the second moulding layer S2, this could for example be obtained by means of foaming and/or spraying and/or pouring.

Figure 7:
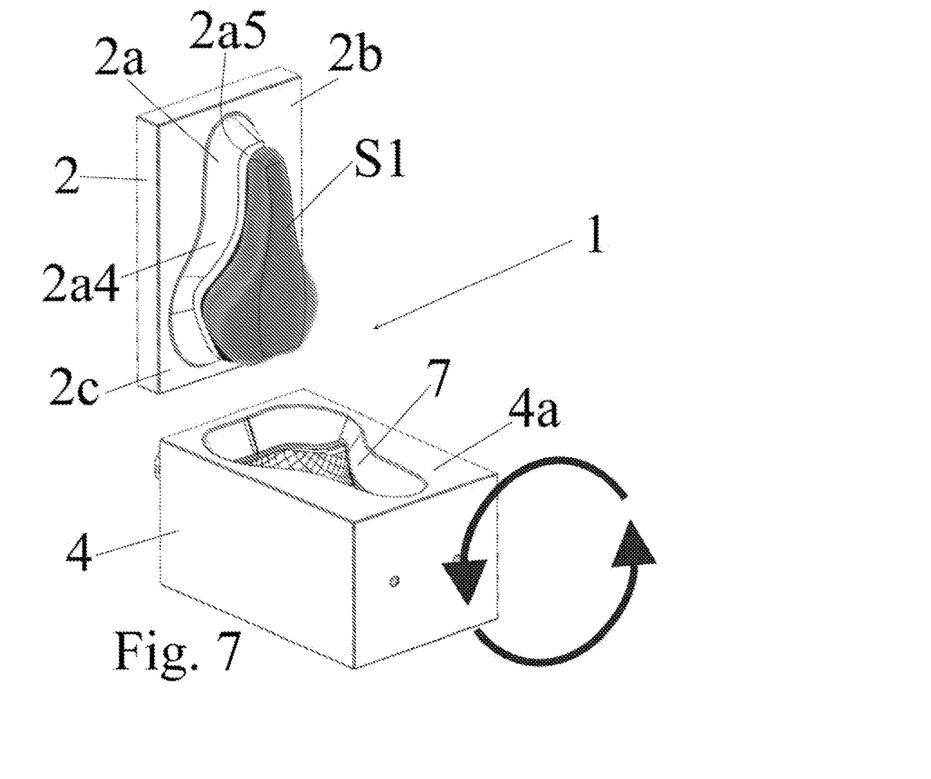

If the unit 1 comprises a second component 4 rotatably mounted, then in order to bring the second recessed area close to the felt HU first the rotation or the displacement of the female component 4 (see FIG. 7) is driven and then means are driven for approaching-moving away the first 2 and the second component 4 so as to bring them into the second closed position.

In such case, the supply of the second mixture into the second recessed area 7 will preferably be carried out after the rotation or the displacement of the female component 4.

Clearly, as an alternative to that indicated above, the supply of the first mixture could also be carried out with moulding unit already closed or better yet in the first closed position.

In the same manner, the supply of the second mixture could also be carried out with moulding unit already closed or better yet in the first closed position.

On such matter, the felt or hull HU can be made of a material selected from the group constituted by a thermoplastic material or a thermoplastic or thermosetting composite.

In addition, the first mixture can be an expandable fluid designated to fill the first moulding impression.

On such matter, the first mixture can comprise or be constituted by polyurethane.

As stated above, the first mixture when moulded causes the formation of a first padding S 1 on the felt or hull HU.

The second mixture can be an expandable fluid designated to fill the second moulding impression.

On such matter, the second mixture can comprise or be constituted by self-peeling polyurethane.

Preferably, in particular in the case of a moulding unit for making a seat, the second foaming layer has an external, in use, under-layer, that does not absorb water and is abrasion resistant.

As indicated above, the second mixture when moulded causes the formation of a second padding S2 on the felt or hull having a first foaming or first moulding or spraying layer S1.

In addition, the first foaming or the first moulding layer S1 is advantageously less dense and softer than the second foaming or second moulding layer S2.

As will be understood, with a moulding unit according to the present invention, it is possible to obtain a felt or hull with double foaming, reducing the movements in the plant, facilitating operation and increasing the quality of the finished objects as well as the efficiency with respect to the solutions proposed up to now.

A support element is also obtained, such as a seat with a second foaming or second moulding layer that is abrasion resistant, but within a less dense and soft first foaming or first moulding layer such to confer greater lightness and softness with respect to an element or seat with a single foaming or moulding layer. In addition, as indicated above, the first foaming or first moulding layer S1 could be obtained by means of different foams or a sandwich of foams having different densities from each other and also applied during subsequent steps.

Modifications and variations of the invention are possible within the protective scope defined by the claims.

The invention claimed is:

1. A moulding unit for producing a vehicle seat, comprising:
    a male component having engagement means for a felt or hull (HU) for the seat to be moulded,
    a female component delimiting a first moulding recessed area in which a first mixture to be solidified or hardened close to said felt or hull can be supplied,
    means for approaching-moving away said male component and said female component between at least one first open position and at least one first closing position for moulding or obtaining a felt or hull with a first foaming or a first moulding layer (S1),
    wherein said moulding unit delimits at least one second recessed area with dimensions different with respect to said first recessed area and extending for an entire length of the seat to be moulded, in said at least one second recessed area being suppliable a second mixture to be solidified and hardened,
    wherein said at least one second recessed area can be positioned in a second closed position close to said felt or hull (HU) moulded previously with a first foaming or first moulding layer alternatively to said first recessed area for moulding a second foaming or second moulding layer or spraying layer on the felt or hull moulded previously with a first foaming or first moulding layer, such that a felt or hull covered with two foamings or two moulding layers can be obtained.

2. The moulding unit according to claim 1, wherein in said at least one first open position of said moulding unit it is possible to constrain a felt or hull (HU) to said engagement means, while in said at least one first closing position said male component and female component are in contact along respective surfaces or faces so as to sealingly close said first recessed area close to and enclosing said felt or hull (HU) and mould on said felt or hull a first mixture for obtaining a felt or hull with a first foaming or first moulding layer.

3. The moulding unit according to claim 1, wherein said female component delimits both said first recessed area and said second recessed area.

4. The moulding unit according to claim 3, wherein said female component is rotatably mounted around a determined axis, said female component delimiting said first recessed area on a first face thereof and said second recessed area on a second face thereof opposite to or different from said first face, and wherein said moulding unit comprises means for the rotation or angular displacement of said female component between a first trim wherein said first face faces towards said male component to obtain the first foaming or first moulding layer and a second trim wherein said second face faces towards said male component to obtain the second foaming or second moulding layer.

5. The moulding unit according to claim 4, wherein said female component is rotatably mounted around an axis orthogonal to the approaching-moving away direction of said male component and said female component or to the relative rotation axis to approach-move away or open-close the male component and female component.

6. The moulding unit according to claim 4, wherein with said female component in said second trim, said approaching-moving away means are designated to approach-move away said male component and said female component between at least one second opening position of said moulding unit and at least one second closed position in which said male component and said female component are in contact along respective surfaces or faces so as to sealingly close said second recessed area close to said felt or hull with a first foaming or first moulding layer and then proceeding to mould a second foaming or second moulding layer by means of heat and/or pressure on the felt or hull with a first foaming or first moulding layer to obtain a felt or hull covered with two foamings or two moulding layers or spraying layer.

7. The moulding unit according to claim 3, wherein said female component delimits the first recessed area and the second recessed area and it can be displaced by translation means between a first trim wherein said first recessed area faces towards said male component to obtain the first foaming or first moulding layer (S1) and a second trim wherein said second recessed area faces towards said male component to obtain the second foaming or second moulding layer or spraying layer (S2).

8. The moulding according to claim 1, wherein said male component comprises a main sheet, while said engagement means comprise a shaped portion projecting from said main sheet and arranged to snap-engage or engage by forced insertion or by suctioning a cavity of a felt or hull (HU) of the vehicle seat.

* * * * *